United States Patent
Probst et al.

(10) Patent No.: US 7,454,687 B2
(45) Date of Patent: Nov. 18, 2008

(54) METHOD AND INFRASTRUCTURE FOR RECOGNITION OF THE RESOURCES OF A DEFECTIVE HARDWARE UNIT

(75) Inventors: Juergen Probst, Wildberg (DE); Charles H. Milligan, Wingdale, NY (US)

(73) Assignee: International Busniess Machines Corporation, Armonk, NY (US)

(*) Notice: Subject to any disclaimer, the term of this patent is extended or adjusted under 35 U.S.C. 154(b) by 562 days.

(21) Appl. No.: 11/160,715

(22) Filed: Jul. 6, 2005

(65) Prior Publication Data

US 2007/0011487 A1 Jan. 11, 2007

(51) Int. Cl.
*G11C 29/00* (2006.01)
(52) U.S. Cl. .............................. 714/763; 714/5; 711/141
(58) Field of Classification Search ................. 714/763, 714/5; 711/141
See application file for complete search history.

(56) References Cited

U.S. PATENT DOCUMENTS

| 5,483,658 A | 1/1996 | Grube et al. |
| 6,154,790 A | 11/2000 | Pruett et al. |
| 2002/0073312 A1 | 6/2002 | Adiano et al. |
| 2002/0162010 A1 | 10/2002 | Allen et al. |
| 2003/0057281 A1 | 3/2003 | Kresina et al. |
| 2004/0003353 A1* | 1/2004 | Rivera et al. ................. 715/530 |
| 2004/0059938 A1 | 3/2004 | Hughes et al. |
| 2007/0011407 A1* | 1/2007 | Kuehl et al. .................. 711/141 |

* cited by examiner

*Primary Examiner*—Guy J Lamarre
(74) *Attorney, Agent, or Firm*—Gibb & Rahman, LLC; Todd M. C. Li, Esq.

(57) ABSTRACT

A system and method of recognizing resources of a computer comprising a system serial number and a broken hardware unit comprising a non-volatile memory unit and enablement definition data relating to functions of the broken hardware unit, wherein the method comprises starting the computer; entering a serial number in a read/write non-volatile memory field of the non-volatile memory unit; reading the read/write non-volatile memory field; and matching the serial number of the read/write non-volatile memory field with the system serial number. The method may further comprise detecting failure of the broken hardware unit after the starting of the computer. Preferably, a reading that the serial number of the read/write non-volatile memory field matches with the system serial number permits acceptance of the enablement definition data of the broken hardware unit.

10 Claims, 3 Drawing Sheets

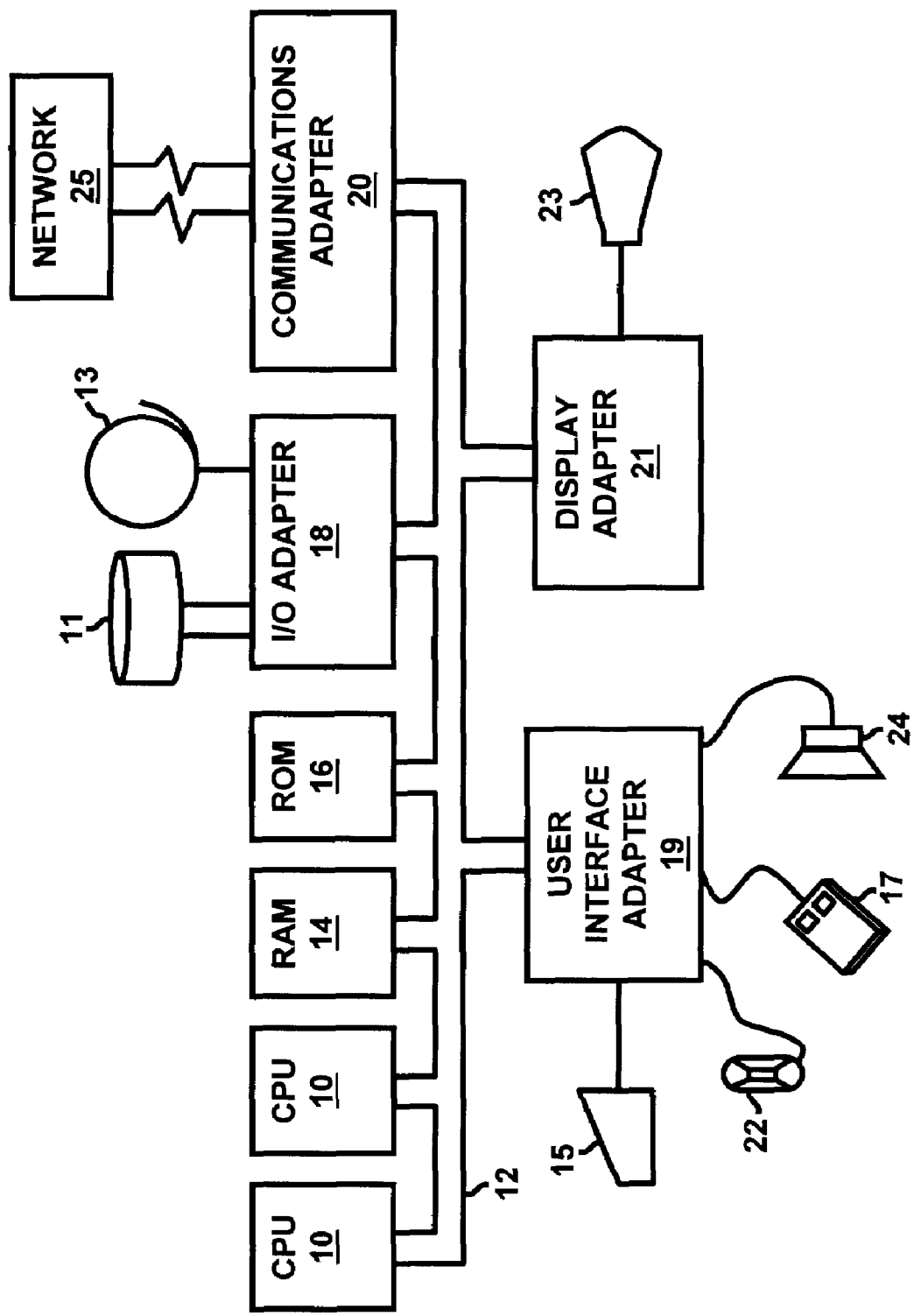

METHOD AND INFRASTRUCTURE FOR RECOGNITION OF THE RESOURCES OF A DEFECTIVE HARDWARE UNIT

BACKGROUND OF THE INVENTION

1. Field of the Invention

The embodiments of the invention generally relate to computer systems, and, more particularly, to identifying defective components in a computer system.

2. Description of the Related Art

A computer system may be comprised of multiple similar or identical hardware units providing the same type of resources. For example, such hardware units may comprise memory cards, multi-chip modules, input/output cards with multiple ports, etc. For granularity and other reasons, those units may not provide their entire physical capacity but by some firmware supported control mechanisms, the exploitation may be limited. For example, only 3 of 12 physical processors may be enabled for execution.

The enablement definition data (i.e., how each processor is to function) is stored in a device that is part of the respective hardware unit. Typically, during system initialization, the totals per enabled hardware entities are calculated by type. The actual allocation of resources at the system level does not have to reflect the enablement definition data per hardware unit, but can be allocated on any of the available physical hardware units of the respective type, just the system totals have to be respected.

In case a single hardware unit of such a system comprised of multiple identical hardware units breaks, the enablement definition data of the broken hardware unit can still be assumed accessible. The enablement definition data of the broken unit can still be respected at the system level if enough physical resources of the respective type are available on other hardware units providing the same type of physical resources. For best system availability, it may be recommended to plug as much physical resources per type into the system such that a complete loss of a single hardware unit still leaves enough physical capacity in the system to fulfill the needs according to the system totals of the enablement definitions as defined across the multiple hardware units.

Even though the broken hardware unit may not have any healthy physical capacity, it still carries the enablement definition data. By moving the broken hardware unit to a different system, the enablement definition data is moved to the target system. If it has unused physical resources, the addition of the broken hardware unit would enable physical resources from the pool of unused physical hardware. For certain reasons, the hardware manufacturer or distributor may not want substandard substitute components for broken hardware that simply deals with the enablement definition data. Therefore, there is a need for a novel technique of identifying resources of a defective hardware unit in a computing system.

SUMMARY OF THE INVENTION

In view of the foregoing, an embodiment of the invention provides a method, and program storage device implementing a method, of recognizing resources of a computer comprising a system serial number and a broken hardware unit comprising a non-volatile memory unit and enablement definition data relating to functions of the broken hardware unit, wherein the method comprises starting the computer; entering a serial number in a read/write non-volatile memory field of the non-volatile memory unit; reading the read/write non-volatile memory field; and matching the serial number of the read/write non-volatile memory field with the system serial number. The method may further comprise detecting failure of the broken hardware unit after the starting of the computer. Preferably, a reading that the serial number of the read/write non-volatile memory field matches with the system serial number permits acceptance of the enablement definition data of the broken hardware unit. Additionally, a reading that the serial number of the read/write non-volatile memory field does not match with the system serial number preferably prevents acceptance of the enablement definition data of the broken hardware unit.

Moreover, a reading that the serial number of the read/write non-volatile memory field does not match with the system serial number preferably discourages transferring the enablement definition data to an alternate computer having a system serial number different from the serial number of the read/write non-volatile memory unit, wherein a transferring of the read/write non-volatile memory unit to an alternate computer having the system serial number different from the serial number of the read/write non-volatile memory unit preferably results in a non-acceptance of the enablement definition data in the alternate computer. The method may further comprise transmitting an error message upon obtaining a reading that the serial number of the read/write non-volatile memory field does not match with the system serial number.

Another embodiment of the invention provides a system comprising a computer comprising a system serial number and a broken hardware unit comprising a non-volatile memory unit comprising a read/write non-volatile memory field and enablement definition data relating to functions of the broken hardware unit. The system further comprises a power unit adapted to start the computer; a first control mechanism adapted to enter a serial number in the read/write non-volatile memory field; a second control mechanism adapted to read the read/write non-volatile memory field; and a processor adapted to match the serial number of the read/write non-volatile memory field with the system serial number. The system may further comprise a diagnostic unit adapted to detect failure of the broken hardware unit after the power unit starts the computer. Preferably, a reading that the serial number of the read/write non-volatile memory field matches with the system serial number permits acceptance of the enablement definition data of the broken hardware unit.

Furthermore, a reading that the serial number of the read/write non-volatile memory field does not match with the system serial number preferably prevents acceptance of the enablement definition data of the broken hardware unit. Additionally, a reading that the serial number of the read/write non-volatile memory field does not match with the system serial number preferably discourages transferring the broken hardware unit to an alternate computer having a system serial number different from the serial number of the read/write non-volatile memory unit, wherein a transferring of the read/write non-volatile memory unit to an alternate computer having the system serial number different from the serial number of the read/write non-volatile memory unit preferably results in a non-acceptance of the enablement definition data of the broken hardware unit.

These and other aspects of embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 3 is a schematic diagram of a system illustrating the computer architecture according to an embodiment of the invention.

DETAILED DESCRIPTION OF PREFERRED EMBODIMENTS OF THE INVENTION

Figure 1:
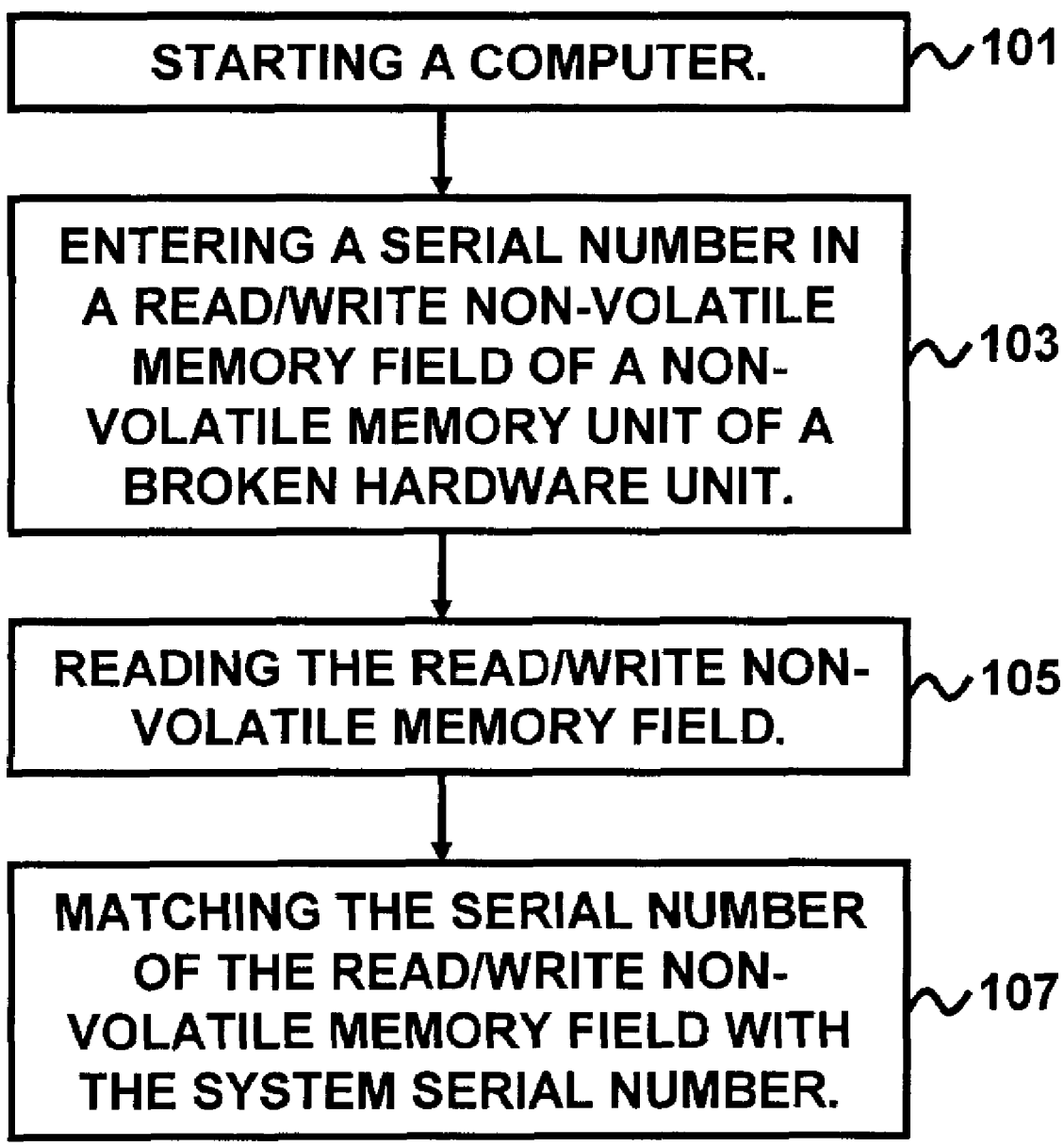
FIG. 1 is a flow diagram illustrating a preferred method of an embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

Figure 2:
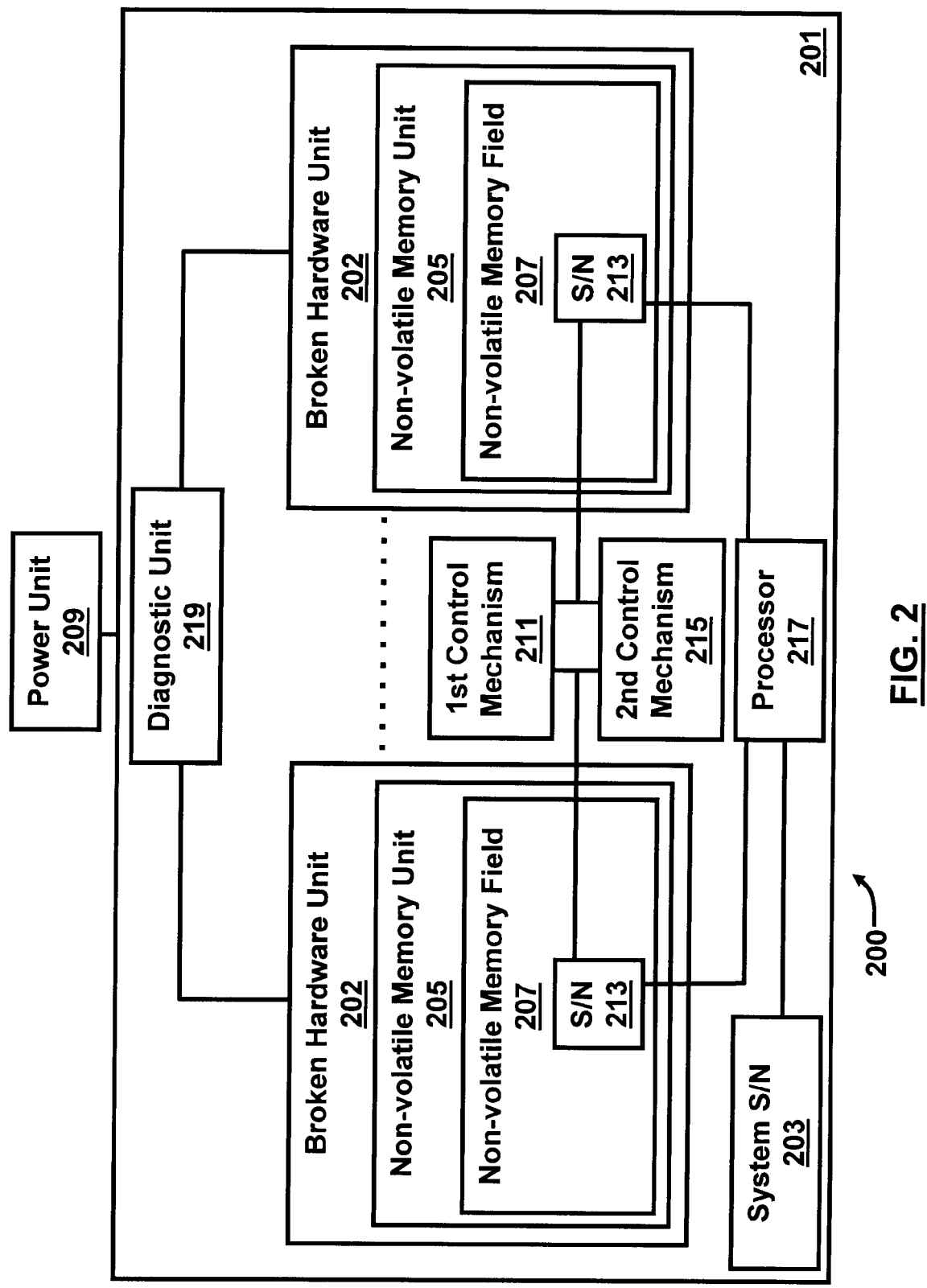
FIG. 2 illustrates a schematic diagram of a computing system according to an embodiment of the invention.

As mentioned, there remains a need for a novel technique of identifying resources of a defective hardware unit in a computing system. The embodiments of the invention achieve this by providing a technique of limiting the use of a broken hardware unit of a computing system to just that particular system where it broke. Referring now to the drawings, and more particularly to FIGS. 1 through 3, where similar reference characters denote corresponding features consistently throughout the figures, there are shown preferred embodiments of the invention.

FIG. 1 illustrates a flow diagram of a method of recognizing resources of a computer comprising a system serial number and a broken hardware unit comprising a non-volatile memory unit and enablement definition data relating to functions of the broken hardware unit, wherein the method comprises starting (101) the computer or concurrently adding hardware to the computer while the computer is already running; entering (103) a serial number in a read/write non-volatile memory field of the non-volatile memory unit of the broken hardware unit; reading (105) the read/write non-volatile memory field; and matching (107) the serial number of the read/write non-volatile memory field with the system serial number. The method further comprises detecting failure of the broken hardware unit after the starting of the computer. A reading that the serial number of the read/write non-volatile memory field of the broken hardware unit matches with the system serial number permits the acceptance of the enablement definition data of the broken hardware unit.

In other words, a reading that the serial number of the read/write non-volatile memory field does not match with the system serial number prevents acceptance of the enablement definition data of the broken hardware unit. Furthermore, a reading that the serial number of the read/write non-volatile memory field does not match with the system serial number discourages transferring the broken hardware unit to an alternate computer having a system serial number different from the serial number of the read/write non-volatile memory unit because a transferring of the broken hardware unit to an alternate computer having the system serial number different from the serial number of the read/write non-volatile memory unit results in a non-acceptance of the enablement definition data of the broken hardware unit in the alternate computer. The method further comprises transmitting an error message upon obtaining a reading that the serial number of the read/write non-volatile memory field does not match with the system serial number.

The embodiments of the invention provide a technique of limiting the use of a broken hardware unit of a computing system to only that particular system where it broke. This can be accomplished by writing the system serial number (S/N) or other unique identifier associated to the system into a field in non-volatile memory such as a vital product data (VPD) repository associated with the hardware unit at that point in time when the failure is detected.

At any subsequent system initialization this field is read by an enablement control firmware from all broken hardware units. If the reading contains a S/N that does not match the actual system S/N, the enablement definition data of the respective hardware unit is not considered as the hardware unit that is now in a system different than when the failure was initially detected. The enablement definition data is only considered if the S/N matches the actual system S/N. Moreover, a qualified repair operation would erase the system S/N field as part of repair, thus allowing the hardware unit to be used again.

The enablement control firmware checks for "broken hardware" (e.g. defective marker) and then looks at the S/N field. According to another embodiment of the invention, the system S/N field of the hardware unit is initialized with a predefined pattern. If the pattern is unchanged or matches the actual system S/N, the enablement definition data is respected, otherwise it is not.

Dependent on the protection approach for the enablement definition data, the VPD repository for the enablement definition data may be a simple serial electrically erasable programmable read-only memory (SEEPROM) or a smart chip. In the case of a SEEPROM, the above-mentioned field for the system S/N preferably comprises a combined hash reflecting the system S/N and the S/N of the hardware unit.

An example of how a test would be performed according to the embodiments of the invention is as follows: A broken part of a system is removed. A restart of the system indicates fewer resources or features because the broken part contains enablements that could use dormant resources of the existing healthy hardware. The broken part is reinstalled and the system is restarted. Then, the capacity and features should as it was prior to removing the broken part given that there are sufficient dormant resources in the healthy hardware units. Moving a running part from a first system to a second system increases capacity or features of the second system. However, moving a broken part from the first system to a second system that originally broke in the first system does not add any capacity or features to the second system.

FIG. 2 illustrates an example of a computer system 200 in accordance with an embodiment of the invention. The system 200 comprises a computer 201 comprising a system serial number 203 and a broken hardware unit 202. The broken hardware unit 202 comprises a non-volatile memory unit 205 comprising a read/write non-volatile memory field 207 and enablement definition data (not shown) relating to functions of the broken hardware unit 202. The system 200 further comprises a power unit 209 adapted to start the computer 201; a first control mechanism 211 adapted to enter a serial number 213 in the read/write non-volatile memory field 207; a second control mechanism 215 adapted to read the read/write non-volatile memory field 207; and a processor 217 adapted to match the serial number 213 of the read/write non-volatile memory field 207 with the system serial number 203. The system 200 further comprises a diagnostic unit 219 adapted to detect failure of the broken hardware unit 202 after the power unit 209 starts the computer 201.

A representative hardware environment for practicing the software embodiments of the invention is depicted in FIG. 3. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Generally, the embodiments of the invention provide a technique for preventing a defective unit form being moved from one system to another. First, a system serial number is entered in a non-volatile memory field of the hardware unit when failure of the unit is detected. The serial number must match the actual system serial number where the unit is installed or find the unchanged initialization pattern. Next, the field is read at each system initialization. This may be a complete system initialization after starting the computer or a partial system initialization executed when hardware is added while the computer is already running. Thus, moving a defective part from a first system to a second system does not add capacity or features to the second system.

The foregoing description of the specific embodiments will so fully reveal the general nature of the embodiments of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention has been described in terms of preferred embodiments, those skilled in the art will recognize that the embodiments of the invention can be practiced with modification within the spirit and scope of the appended claims.

What is claimed is:

1. A computer-implemented method of recognizing hardware resources of a computer, said computer comprising a system serial number and a broken hardware unit, and said broken hardware unit comprising a non-volatile memory unit and enablement definition data relating to functions of said broken hardware unit, said method comprising:

starting said computer;

reading a read/write non-volatile memory field of said non-volatile memory unit to acquire a previously entered system serial number;

determining if said previously entered system serial number acquired from said read/write non-volatile memory field is the same as said system serial number; and preventing acceptance by said computer of said enablement definition data of said broken hardware unit and outputting an error message, when said previously entered system serial number and said system serial number do not match so as to prevent addition of capacity and features of said broken hardware unit to said computer.

2. The method of claim 1, further comprising detecting by a diagnostic unit failure of said broken hardware unit.

3. The method of claim 1, wherein a reading that said previously entered system serial number acquired from said read/write non-volatile memory field matches with said system serial number permits acceptance of said enablement definition data of said broken hardware unit so as to allow addition of said capacity and features of said broken hardware unit to said computer.

4. The method of claim 1, wherein a reading that said previously entered system serial number acquired from said read/write non-volatile memory field does not match with said system serial number discourages transferring said enablement definition data to an alternate computer having another system serial number different from said previously entered system serial number acquired from said read/write non-volatile memory field.

5. The method of claim 4, wherein a transferring of said read/write non-volatile memory unit to an alternate computer having said another system serial number different from said previously entered system serial number acquired from said read/write non-volatile memory field results in a non-acceptance of said enablement definition data in said alternate computer.

6. A program storage device readable by computer, tangibly embodying a program of instructions executable by said computer to perform a method of recognizing resources of a computer, said computer comprising a system serial number and a broken hardware unit, and said broken hardware unit comprising a non-volatile memory unit and enablement definition data relating to functions of said broken hardware unit, said method comprising:

starting said computer;

reading a read/write non-volatile memory field of said non-volatile memory unit to acquire a previously entered system serial number;

determining if said previously entered system serial number acquired from said read/write non-volatile memory field is the same as said system serial number; and preventing acceptance by said computer of said enablement definition data of said broken hardware unit and outputting an error message, when said previously entered system serial number and said system serial number do not match so as to prevent addition of capacity and features of said broken hardware unit to said computer.

7. The program storage device of claim 6, wherein said method further comprises detecting by a diagnostic unit failure of said broken hardware unit.

8. The program storage device of claim 6, wherein a reading that said previously entered system serial number acquired from said read/write non-volatile memory field matches with said system serial number permits acceptance of said enablement definition data of said broken hardware unit.

9. The program storage device of claim 6, wherein a reading that said previously entered system serial number acquired from said read/write non-volatile memory field does not match with said system serial number discourages transferring said enablement definition data to an alternate computer having another system serial number different from said previously entered system serial number acquired from said read/write non-volatile memory field.

10. The program storage device of claim 9, wherein a transferring of said read/write non-volatile memory unit to an alternate computer having said another system serial number different from said previously entered system serial number acquired from said read/write non-volatile memory field results in a non-acceptance of said enablement definition data in said alternate computer.

* * * * *